United States Patent
Johnson

(10) Patent No.: US 7,475,545 B2
(45) Date of Patent: Jan. 13, 2009

(54) FLADED SUPERSONIC MISSILE TURBOJET

(75) Inventor: James Edward Johnson, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 249 days.

(21) Appl. No.: 11/118,698

(22) Filed: Apr. 29, 2005

(65) Prior Publication Data

US 2006/0242941 A1 Nov. 2, 2006

(51) Int. Cl.
*F02K 3/10* (2006.01)
(52) U.S. Cl. .......................... 60/761; 60/262
(58) Field of Classification Search .............. 60/226.1, 60/761–766, 262, 770, 771, 39.281, 233, 60/228; 239/265.17; 244/53 R, 56, 3.22
See application file for complete search history.

(56) References Cited

U.S. PATENT DOCUMENTS

| | | | |
|---|---|---|---|
| 2,846,843 A | 8/1958 | Clark et al. | |
| 3,296,804 A | 1/1967 | Keenan et al. | |
| 3,382,670 A | 5/1968 | Venable | |
| 3,420,060 A | 1/1969 | Ostroff et al. | |
| 3,677,012 A | 7/1972 | Batscha | |
| 3,729,957 A | 5/1973 | Petrie et al. | |
| 3,779,007 A * | 12/1973 | Lavash | 60/39.281 |
| 3,826,586 A * | 7/1974 | Richards | 415/42 |
| 3,830,056 A | 8/1974 | Willis et al. | |
| 3,834,160 A * | 9/1974 | Moehring et al. | 60/243 |
| 3,938,328 A | 2/1976 | Klees | |
| 4,038,817 A * | 8/1977 | Snow et al. | 60/204 |
| 4,043,121 A | 8/1977 | Thomas et al. | |
| 4,052,847 A | 10/1977 | Rodgers et al. | |
| 4,054,030 A | 10/1977 | Pedersen | |
| 4,055,042 A | 10/1977 | Colley | |
| 4,060,981 A | 12/1977 | Hampton | |
| 4,064,692 A | 12/1977 | Johnson et al. | |
| 4,068,471 A | 1/1978 | Simmons | |
| 4,069,661 A * | 1/1978 | Rundell et al. | 60/204 |
| 4,072,008 A | 2/1978 | Kenworthy et al. | |
| 4,080,785 A * | 3/1978 | Koff et al. | 60/226.3 |

(Continued)

FOREIGN PATENT DOCUMENTS

GB 757818 A 9/1956

(Continued)

OTHER PUBLICATIONS

GE Aircraft Engines, "J93 Engine Cross Section," publicly available more than one year before Mar. 1, 2005, singe page.

(Continued)

*Primary Examiner*—William H Rodriguez
(74) *Attorney, Agent, or Firm*—William S. Andes; Francis L. Conte

(57) ABSTRACT

A turbojet engine includes a core engine, afterburner, and converging-diverging exhaust nozzle disposed in serial flow communication. A bypass duct surrounds the core engine and afterburner and terminates in flow communication with the exhaust nozzle. The compressor includes first stage fan blades having integral flades at the tips thereof disposed inside the bypass duct. The bypass duct includes a row of variable inlet guide vanes disposed forward of the flades for controlling airflow thereto.

21 Claims, 4 Drawing Sheets

U.S. PATENT DOCUMENTS

| | | | |
|---|---|---|---|
| 4,095,420 A * | 6/1978 | Abernethy et al. ............ 60/204 |
| 4,175,384 A * | 11/1979 | Wagenknecht et al. ..... 60/226.3 |
| 4,176,792 A | 12/1979 | McCardle, Jr. |
| 4,435,958 A * | 3/1984 | Klees ............................ 60/204 |
| 4,551,971 A | 11/1985 | Suzuki |
| 4,958,489 A | 9/1990 | Simmons |
| 5,349,814 A | 9/1994 | Ciokajlo et al. |
| 5,402,638 A | 4/1995 | Johnson |
| 5,404,713 A * | 4/1995 | Johnson ........................ 60/204 |
| 5,435,127 A * | 7/1995 | Luffy et al. .................... 60/204 |
| 5,806,303 A * | 9/1998 | Johnson ........................ 60/262 |
| 5,809,772 A * | 9/1998 | Giffin et al. ................. 60/226.1 |
| 5,996,936 A * | 12/1999 | Mueller ..................... 244/53 R |
| 6,112,513 A * | 9/2000 | Catt et al. ...................... 60/204 |
| 6,336,319 B1 | 1/2002 | Koshoffer |
| 6,487,847 B1 * | 12/2002 | Snow et al. .................... 60/235 |
| 6,895,741 B2 | 5/2005 | Rago et al. ................. 60/226.1 |
| 7,013,636 B2 * | 3/2006 | Iya et al. ........................ 60/204 |
| 7,185,485 B2 * | 3/2007 | Lewis ............................ 60/243 |
| 7,216,475 B2 * | 5/2007 | Johnson ..................... 60/226.1 |
| 2003/0074884 A1 * | 4/2003 | Snow et al. .................... 60/204 |
| 2003/0145577 A1 | 8/2003 | Hunter et al. |
| 2005/0081509 A1 | 4/2005 | Johnson |
| 2005/0284150 A1 | 12/2005 | Dittmar et al. |
| 2006/0042252 A1 * | 3/2006 | Derouineau .................. 60/703 |
| 2007/0044476 A1 * | 3/2007 | Koshoffer ..................... 60/776 |

FOREIGN PATENT DOCUMENTS

| | | |
|---|---|---|
| GB | 822299 A | 10/1959 |
| GB | 827744 A | 2/1960 |
| GB | 921727 A | 3/1963 |
| GB | 1069872 A | 5/1967 |
| GB | 1273017 A | 5/1972 |
| GB | 1452267 A | 10/1976 |
| GB | 2054745 A | 2/1981 |
| WO | WO 2004/022948 A1 | 3/2004 |

OTHER PUBLICATIONS

Janes, "USA: Engines," Jane's All the World's Aircraft, 1986, pp. cover, 958, 959, 962, & 963.

www.fiddlergreen.net, "Raytheon Tomahawk B6M-109 Cruise Missile," Mar. 1, 2005, 5 pages, printed article only, 5 pages.

www.labiker.org, "001—Flight of the Valkyrie," Mar. 15, 2005, 17 pages, printed article only.

Johnson, U.S. patent application No. , concurrently filed Apr. 29, 2005, "Supersonic Missile Turbojet Engine".

Johnson, U.S. patent application No. , concurrently filed Apr. 29, 2005, "Thrust Vectoring Missile Turbojet".

Johnson, U.S. patent application No. , concurrently filed Apr. 29, 2005, "Self Powered Missile Turbojet".

Johnson, U.S. Appl. No. 11/118,967, filed Apr. 29, 2005, "Supersonic Missile Turbojet Engine".

Johnson, U.S. Appl. No. 11/118,171, filed Apr. 29, 2005, "Thrust Vectoring Missile Turbojet".

Johnson, U.S. Appl. No. 11/118,966, filed Apr. 29, 2005, "Self Powered Missile Turbojet".

\* cited by examiner

FLADED SUPERSONIC MISSILE TURBOJET

BACKGROUND OF THE INVENTION

The present invention relates generally to gas turbine engines, and, more specifically, to supersonic missile engines.

Typical commercial and military aircraft are powered by multi-rotor turbofan gas turbine engines. A forward fan is powered by a low pressure turbine (LPT). A multistage axial compressor follows the fan and is powered by a multistage high pressure turbine (HPT).

An annular combustor is located between the compressor and the HPT for mixing fuel with the pressurized air and generating hot combustion gases from which energy is extracted by the HPT and LPT during operation. The rotor blades of the two turbines are joined to corresponding rotor shafts or spools to the rotor blades of the fan and the compressor.

The turbofan engine is sized for producing near maximum propulsion thrust during takeoff operation of the aircraft being powered thereby during which maximum airflow or mass flow is achieved in the engine at a correspondingly high rotor speed of the HPT and compressor, and a lower speed for the LPT and fan.

In order to provide additional propulsion thrust for military aircraft, and typically for supersonic operation thereof, an augmentor or afterburner may be introduced following the turbofan core engine. The typical afterburner includes an annular combustion liner, with a plurality of fuel spray bars and V-gutter flameholders at the forward end thereof. An articulated converging-diverging (CD) nozzle is disposed at the aft end of the afterburner for discharging the combustion exhaust gases during operation.

The CD exhaust nozzle is typically formed of a row of primary exhaust flaps which converge in the downstream direction to a throat of minimum flow area from which a row of secondary exhaust flaps diverge to the nozzle outlet for providing controlled diffusion of the exhaust flow being discharged. A suitable drive train, including one or more actuators and linkages, controls the kinematic motion of the exhaust flaps in accordance with predetermined schedules for the converging and diverging slopes of the flaps and the flow area at the throat therebetween.

During subsonic operation of the aircraft below Mach 1 when the afterburner is operated dry without fuel flow through the spray bars thereof, the nozzle throat has a minimum flow area for maximizing performance of the core engine.

During wet operation of the afterburner when fuel flow is scheduled through the spray bars, the fuel is mixed with the spent combustion gases from the core engine and ignited to re-energize the combustion gases and provide additional propulsion thrust from the engine.

Full-time operation of the afterburner permits transonic and supersonic operation of the aircraft above Mach 1 which requires the increased propulsion thrust from the engine. And during wet operation, the CD nozzle is scheduled to increase the flow area of the throat for accommodating the increased mass flow of the combustion gases discharged therethrough for maintaining efficiency and performance of the engine during supersonic flight.

Whereas gas turbine engines specifically configured for powering aircraft in flight are relatively complex for the required safety of operation for carrying people in flight over an extended number of flight cycles, gas turbine engines for missile applications may be considerably simpler in configuration, and smaller in size, and specifically configured for single flight applications for reaching the intended military target, without the need to carry people.

Various forms of turbojet and turbofan gas turbine engines are known for powering military missiles typically at subsonic flight speeds. The engines are configured as simply as possible and as small as possible for producing the required propulsion thrust for the intended flight range.

Air breathing missiles, like their counterpart manned aircraft, require a suitable inlet for channeling ambient air to the engine. The engine includes a suitable compressor for pressurizing the air which is then mixed with fuel in a combustor for generating hot combustion gases. Energy is extracted from the combustion gases in variously configured turbines for producing propulsion thrust to power the missile.

Since currently known missiles have subsonic flight limits, afterburners and the associated increase in size and complexity are avoided in such missiles.

However, supersonic flight, air breathing missile systems can provide corresponding advantages for military applications and are the next progression in the development of missile systems. In particular, air breathing missile systems in the Mach 3.0-3.5 class require substantial propulsion thrust capability from subsonic, through transonic, and to the maximum supersonic flight speeds required. Since weight is a paramount design objective for all flying systems, supersonic missiles should maximize payload capability while minimizing missile size, weight, and cost, which are competing objectives.

The gas turbine engine designed for a supersonic missile system fundamentally affects the entire configuration of the missile and its payload capability and flight range. A suitable engine should have minimum engine size and provide balanced thrust production at key transonic and supersonic flight conditions.

The engine design should simplify the design requirements of the Mach 3.0-3.5 class air inlet for the missile. Correspondingly, the engine design should simplify the exhaust system for the Mach 3.0-3.5 missile.

The engine design should address the mitigation of air vehicle, or missile, and engine installation losses. The installed engine may further include thrust vectoring capabilities but should be integrated in an efficient manner.

Since the engine must produce electrical power in addition to propulsion thrust during operation, the engine design as integrated in the missile should also include improved power generation and power supply capabilities therein. The typical engine control and accessories should be minimized in size and packaging for effecting a compact missile system.

Since the engine generates considerable heat during operation, and the missile will fly at substantially maximum flight speed over its intended flight range, critical thermal management issues must also be addressed in the engine design for achieving reliable operation of the missile to its intended target.

And, the many and varied competing design factors in a supersonic class air breathing missile must also be addressed for providing minimum weight of the missile and engine system, minimum size, maximum performance and reliability, all with the minimum cost of production specific to the propulsion engine itself.

Accordingly, it is desired to provide an improved gas turbine engine for a supersonic missile application.

BRIEF DESCRIPTION OF THE INVENTION

A turbojet engine includes a core engine, afterburner, and converging-diverging exhaust nozzle disposed in serial flow communication. A bypass duct surrounds the core engine and afterburner and terminates in flow communication with the exhaust nozzle. The compressor includes first stage fan blades having integral flades at the tips thereof disposed inside the bypass duct. The bypass duct includes a row of variable inlet guide vanes disposed forward of the flades for controlling airflow thereto.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
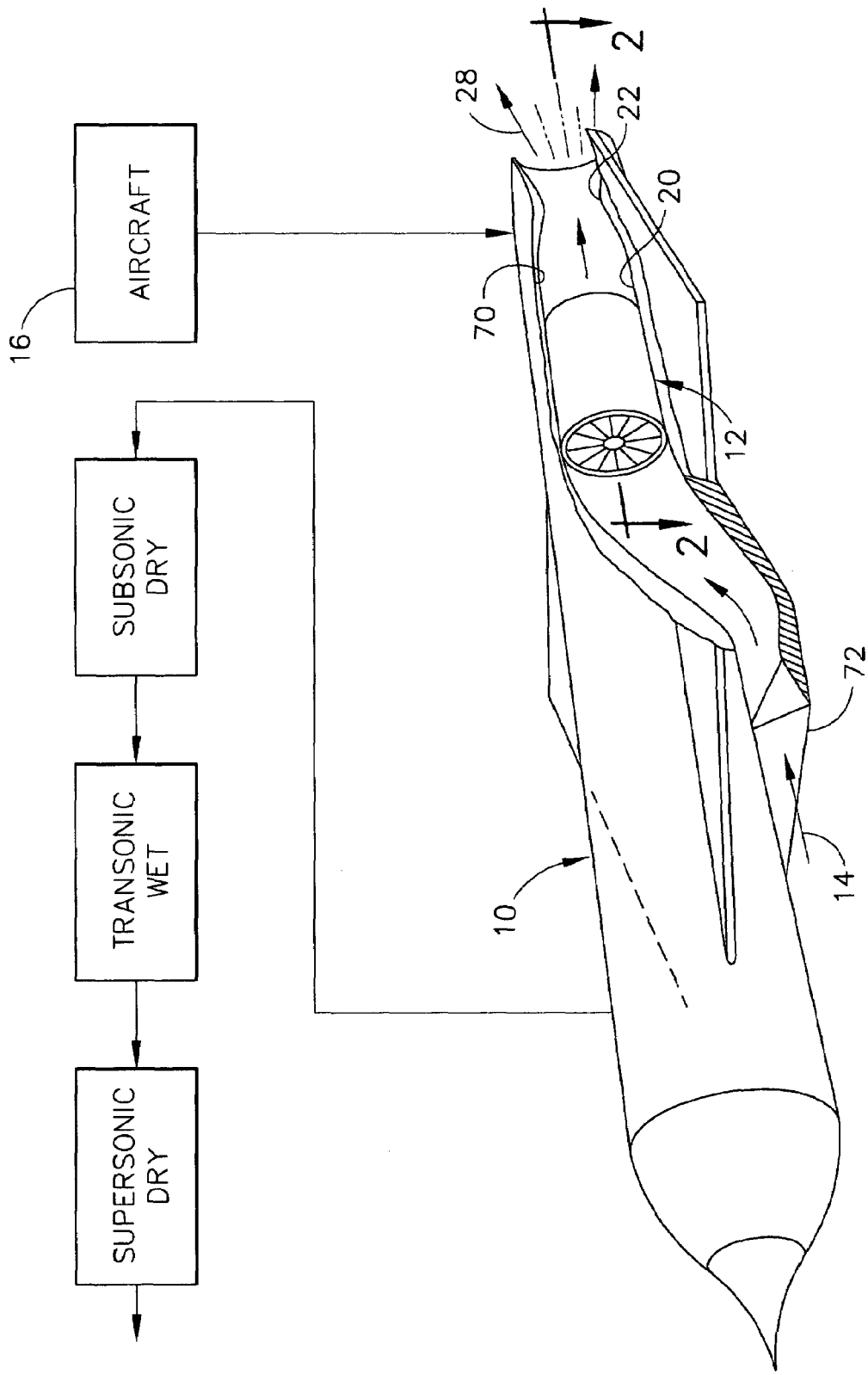
FIG. 1 is a partly schematic isometric view of an exemplary supersonic missile powered by a turbojet gas turbine engine.

Illustrated in FIG. 1 is an exemplary supersonic missile 10 powered by a turbojet gas turbine engine 12 suitably mounted inside the aft end thereof. The missile 10 itself may have any suitable configuration and size for flight operation from subsonic, through transonic, and into supersonic flight speeds in the class of Mach 3.0-3.5.

The missile is air breathing and ingests ambient air 14 during operation which is compressed inside the turbojet engine 12 for producing all of the propulsion thrust required for subsonic through supersonic operation of the missile.

In a typical application, the missile 10 is sized and configured for being carried to high altitude by a corresponding military aircraft 16 which will launch the missile at altitude for subsequent travel to the intended target. The missile is released from the aircraft and powered by the turbojet engine which is operated in turn for accelerating the missile from subsonic speed when released from the aircraft, through transonic speed and into the intended supersonic Mach 3.0-3.5 maximum speed thereof.

Figure 2:
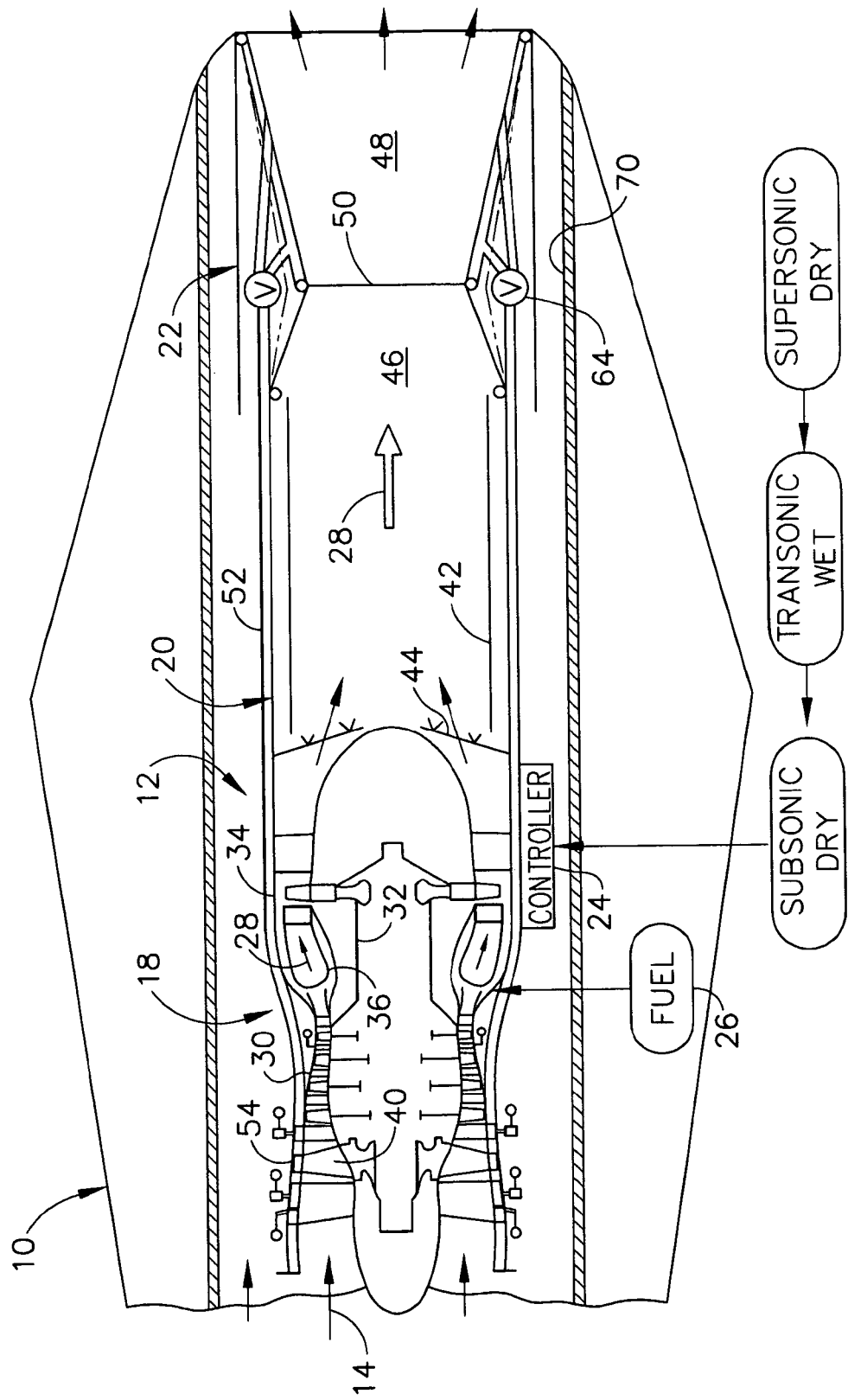
FIG. 2 is an enlarged axial sectional view of the turbojet engine illustrated in FIG. 1 and taken along line 2-2.

The turbojet engine 12 is illustrated in more detail in FIG. 2 and includes a core engine 18, an augmentor or afterburner 20, and a converging-diverging (CD) exhaust nozzle 22 disposed in serial flow communication coaxially along a longitudinal or axial centerline axis extending longitudinally through the engine and surrounding missile.

The engine also includes a suitable controller 24, such as a conventional digitally programmable computer, which is operatively joined to the core engine 18, afterburner 20, and exhaust nozzle 22 for controlling and coordinating operation thereof. The controller is suitably configured, in software for example, for scheduling fuel 26 to the core engine and afterburner which is mixed with the incoming air 14 for generating hot combustion gases 28 during operation.

In particular, the controller 24 provides means for scheduling fuel to the afterburner in a predetermined schedule for operating the afterburner dry without additional fuel injected therein during subsonic flight of the engine and missile, operating the afterburner wet with additional fuel injected therein during transonic flight operation of the missile, and again operating the afterburner dry without additional fuel injected therein during supersonic flight of the missile in turn as the engine accelerates the missile in speed from its initial subsonic speed below Mach 1 to the intended maximum supersonic speed, such as the Mach 3.0 to 3.5 maximum flight speed desired.

The controller therefore has the technical effect of operating the engine components to achieve the necessary propulsion thrust for subsonic, transonic, and supersonic flight operation of the missile powered by the engine.

For transonic flight operation between subsonic and supersonic flight speeds, the afterburner is operated wet with additional fuel being injected therein for re-energizing the combustion gases and providing the additional propulsion thrust for powering the missile through the portion of the flight envelope in which the sound barrier is broken. The afterburner should be operated wet only as required for the specific missile propulsion requirements of the flight envelope to minimize fuel consumption.

For example, transonic wet operation may occur in the exemplary range of Mach 0.8 to about Mach 2.0. Above Mach 2.0 operation, the afterburner is operated dry to conserve fuel and maximize missile flight range. And, if required, the afterburner may again be operated wet, for example greater than about Mach 3.0, to meet the higher propulsion thrust requirements of the missile in this portion of the flight envelope.

The core engine 18 is illustrated in FIG. 2 and includes a multistage axial compressor 30 which pressurizes the ambient air 14 received from outside the missile. The compressor 30 is joined by a shaft or rotor 32 to a single-stage high pressure turbine (HPT) 34 disposed downstream therefrom. The HPT includes a stator nozzle and a row of turbine rotor blades which power the rotor 32.

An annular combustor 36 is disposed between the compressor and HPT and receives the pressurized air from the compressor which is then mixed with fuel in the combustor for generating the hot combustion gases 28 that are discharged through the turbine which extracts energy therefrom to in turn power the compressor.

Figure 3:
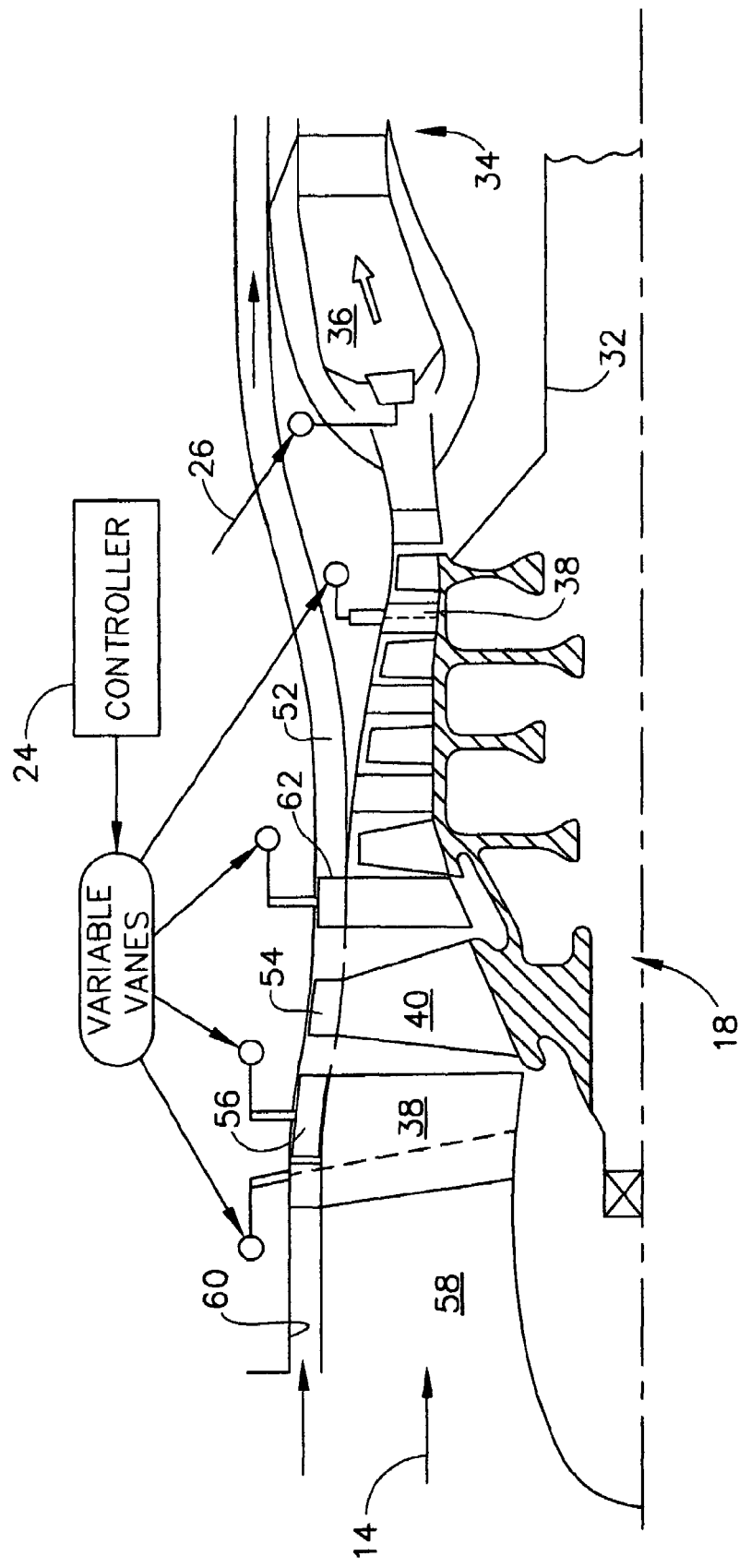
FIG. 3 is an enlarged axial sectional view of a portion of the core engine illustrated in FIG. 2.

An exemplary configuration of the compressor 30 is shown in FIG. 3 and includes sequential stages or rows of cooperating stator vanes 38 extending radially inwardly from a supporting stator casing, and corresponding rows of rotor or compressor blades 40 extending radially outwardly from corresponding supporting disks joined to the rotor 32. The first two and last stages of the compressor vanes 38 are variable, with each variable vane being rotatable around a radial axis thereof for varying the flow area and direction of the intervane flow passages during operation. Each row of variable vanes 38 includes a conventional drive train for simultaneously rotating each of the vanes in unison.

Variable stator vanes in axial compressors are conventionally known along with their corresponding actuation or drive trains which include corresponding levers, unison rings, and actuators for adjusting the rotary position of the vanes in each row. The corresponding drive trains for the variable vanes are in turn operatively joined to the engine controller 24 which controls the precise rotary position of the various variable vane stages for maintaining suitable stall margin of the compressor during the entire flight envelope as well as maximizing efficiency of the compressor.

Conventional axial compressors in modern turbojet or turbofan aircraft engines typically include multiple stages of variable stator vanes at the forward end of the compressor with the last several stages of stator vanes being fixed, and not variable. In contrast, the turbojet engine illustrated in FIG. 3 additionally introduces variable stator rear vanes 38 in the last compressor stage for effecting different positions corresponding with subsonic dry operation and supersonic dry operation in particular.

All of the variable stator vanes in the compressor are suitably scheduled for corresponding rotary positions thereof for maintaining adequate stall margin of the compressor during the entire flight envelope of the missile.

However, the rotary position of the last stage compressor vanes is suitably scheduled in the controller 24 to limit the physical rotational speed of the rotor 32 during dry supersonic flight requiring maximum airflow through the compressor, with that rotor speed being limited to about the physical rotary speed of the rotor 32 during dry subsonic flight requiring correspondingly less airflow through the compressor.

The single-rotor afterburning turbojet engine illustrated in FIG. 2 provides substantial benefits for the Mach 3.0-3.5 class air breathing missile. Balanced thrust production can be achieved by incorporating the afterburner 20 for transonic propulsion thrust needs while providing the desired dry Mach 3.0-3.5 propulsion thrust levels by suitable scheduling of the airflow through the engine and turbine inlet temperature.

The specific introduction of the last-stage rear variable stator vanes in the compressor 30 permits tailoring of the compressor map flow-speed characteristic through the engine to limit operating physical speeds at Mach 3.0-3.5 to about the same levels of rotor speed at sea level static values. This allows a relatively high corrected speed to be used in the design of the compressor which in turn minimizes the number of stages and resulting cost of the high specific flow, low radius ratio compression system. Furthermore, the accompanying high physical rotary speed of the rotor 32 minimizes diameter of the high pressure turbine 34 for a given turbine aerodynamic loading, keeping the maximum envelope diameter of the engine as small as possible.

The afterburner 20 illustrated in FIG. 2 may have a conventional configuration derived from corresponding augmented aircraft engines but sized sufficiently small for the small missile application. The afterburner 20 may include a tubular combustion liner 42 mounted concentrically inside a surrounding annular casing to define an annular liner duct radially therebetween.

The inlet end of the afterburner liner 42 receives the spent combustion gases 28 from the core engine, a portion of which may be diverted through the liner duct for cooling the afterburner liner during operation.

A plurality of conventional fuel spray bars 44, with conventional V-gutter flameholders attached thereto, extend radially inwardly from the afterburner casing at the forward end of the afterburner liner 42. The fuel spray bars 44 are operatively joined to the engine controller 24 for scheduling fuel flow to the spray bars of the afterburner during operation.

In this way, the engine controller 24 controls operation of both the main combustor 36 in the core engine and the afterburner combustor through the corresponding fuel injectors therefor, with the fuel being scheduled thereto in accordance with the subsonic, transonic, and supersonic flight requirements of the turbojet engine.

The exhaust nozzle 22 is illustrated schematically in FIG. 2 in an exemplary embodiment. The nozzle may include a plurality of articulated primary flaps defining a converging inlet duct 46. A plurality of articulated or pivotable secondary flaps are disposed downstream therefrom to define a diverging outlet duct 48. The inlet duct 46 converges aft in flow area to a throat 50 of minimum flow area, and the outlet duct 48 diverges aft therefrom for diffusing the combustion gases 28 discharged from the nozzle outlet during operation.

The primary and secondary flaps are operatively joined to a suitable drive train including linkages and one or more actuators for varying slope of the flaps in their converging and diverging inclines, while also varying flow area (typically designated A8) at the throat 50. The controller 24 is configured with suitable software for scheduling the desired flow area of the throat 50 and the corresponding inclinations of the converging and diverging ducts 46, 48 for cooperating with the core engine during operation.

For example, the controller 24 is specifically configured for adjusting the exhaust nozzle 22 for varying flow area of the throat 50 for minimum flow area during dry subsonic flight of the missile, and with maximum flow area during wet transonic flight of the missile, and with an intermediate flow area between the minimum and maximum flow areas during the dry or wet supersonic flight of the missile all of which require different mass flow rates of the compressed air and combustion gases channeled through the turbojet engine during operation.

Unlike a typical augmented aircraft engine in which the afterburner thereof must be operated full time during supersonic flight in excess of Mach 2, the afterburner 22 in the turbojet engine illustrated in FIG. 2 is operated wet solely or primarily in the transonic portion of the flight envelope, while being operated dry both in the slower subsonic portion and the faster supersonic portion of the flight envelope. Correspondingly, the rear variable stator vanes of the compressor 30 are coordinated with increasing flight speed, and with operation of the afterburner, to prevent excessive speed of the rotor 32 while still providing the maximum mass flow rate through the turbojet engine required for efficient propulsion thrust in the Mach 3.0-3.5 flight envelope.

The CD exhaust nozzle 22 illustrated in FIG. 2 may have any conventional configuration such as that found in military aircraft suitably sized for the substantially smaller application thereof in the supersonic missile. The nozzle may be circular in cross section or rectangular in accordance with conventional aircraft practice and should be simplified as much as possible for the disposable application of the turbojet engine in the missile.

Other embodiments of the CD exhaust nozzle may be used for further simplifying the features thereof while providing the desired converging and diverging exhaust ducts with the intermediate throat therebetween for matching operation of the core engine for the subsonic, transonic, and supersonic flight regimes.

As initially shown in FIG. 2, an annular bypass duct 52 surrounds the core engine 18 and afterburner 20 and terminates in flow communication with the exhaust nozzle 22. The bypass duct may be formed by an annular outer casing extending the length of the engine, with the inner boundary thereof being defined by an inner casing which may be formed in part by portions of the compressor and afterburner cases.

The forward portion of the engine is illustrated in more detail in FIG. 3. As indicated above, the compressor 30 includes sequential stages of stator vanes 38 and rotor blades 40, with the first stage of rotor blades also being referred to as fan blades in view of their maximum size in the compressor. The first stage fan blades extend radially outwardly from a supporting rotor disk which forms the forward portion of the high pressure turbine rotor 32.

Each of the first stage fan blades includes an integral airfoil or flade 54 extending radially outwardly from the radially outer tip of the blade with a suitable tip shroud or platform integrally formed therebetween. The fladed first stage fan blades are known in the prior art, with the term flade being an acronym for "fan on blade." In other words, the first stage fan rotor blades have distinctive radially inner and radially outer airfoil portions each of which has a generally concave pressure side and generally convex suction side extending axially between leading and trailing edges which extend radially outwardly from the supporting rotor disk.

The flade portion of each of the first stage fan blades is disposed inside the surrounding annular bypass duct 52 at the inlet end thereof. The bypass duct 52 includes a row of variable inlet guide vanes (VIGVs) 56 disposed forward or upstream of the flades 54 for controlling airflow thereto. The guide vanes 56, like the variable compressor vanes 38, are joined by suitable drive trains to the common controller 24 for controlled rotary position thereof during operation.

The core engine 18 illustrated in FIG. 3 includes a radially inner annulus or inlet 58 at the forward end thereof in front of the first stage stator vanes 32 and rotor blades 40. Correspondingly, the bypass duct 52 includes a radially outer annulus or inlet 60 at the forward end thereof in front of guide vanes 56 and surrounding the inner inlet 58.

The guide vanes 56 are operatively joined to the controller 24 which is specifically configured for controlling airflow into the bypass duct 52 for matching the airflow supply to the inner inlet 58 to the corresponding demand therefor in the core engine 18 over the operating cycle of the engine including subsonic flight of the missile, transonic flight, and supersonic flight.

The increasing speed of the missile through the flight mission correspondingly requires increased propulsion thrust and mass flow through the engine. As the missile is flown supersonically, excess air will be provided to the core engine during various portions of the flight envelope. Accordingly, the bypass duct 52 as controlled by the inlet guide vanes 56 may be used for selectively bypassing a portion of the incoming airflow around the core engine to the exhaust nozzle.

The advantage of using the integral flades 54 is their ability to pressurize the inlet air in the bypass duct to a suitable pressure for bypassing the core engine and reintroducing the pressurized bypass air into the combustion gases being discharged through the exhaust nozzle while maximizing efficiency and performance of the engine.

The bypass duct 52 preferably also includes a row of outlet guide vanes (OGVs) 62 disposed downstream behind the row of flades 54. In the exemplary embodiment illustrated in FIG. 3, the outlet vanes 62 are variable like the inlet vanes 56 and include corresponding drive trains joined to the controller for controlling rotary position thereof.

Correspondingly, the flades 54 are sized and configured with suitable airfoil profiles for pressurizing the airflow in the bypass duct 52 for flow through the exhaust nozzle 22 into the combustion gases 28 being discharged therethrough as illustrated in FIG. 2.

The flade system illustrated in FIG. 2 in conjunction with the basic compressor 30 can be used to develop a total airflow schedule that will provide a near perfect match of inlet air supply to the engine demand airflow schedules which will help minimize inlet installation losses. This is effected by efficiently bypassing excess air around the core engine while also introducing pressure in the bypass air. The pressurized air in the bypass duct 52 may then be used to help cool the afterburner case as well as cool portions of the exhaust nozzle itself.

More specifically, the bypass duct 52 illustrated in FIG. 2 may include in part the outer casing of the afterburner 20 which extends axially between the core engine and the exhaust nozzle. As indicated above, the exhaust nozzle 22 includes the converging inlet duct 46 that channels exhaust flow to the throat 50 of minimum flow area, with the exhaust flow then undergoing diffusion in the diverging outlet duct 48.

In the exemplary embodiment illustrated in FIG. 2, the outlet duct 48 is disposed in flow communication with the discharge end of the bypass duct 52 for reintroducing the pressurized bypass air into the combustion gas exhaust flow. The flades 54 are configured as airfoils as above described to pressurize the airflow for flow through the bypass duct 52 and thereby cool the afterburner casing as well as cooling the nozzle outlet duct 48.

In the exemplary embodiment illustrated in FIG. 2, the bypass duct 52 terminates in an annular flow distribution manifold 64 disposed at or near the exhaust nozzle 22. The manifold 64 is joined through suitable tubes or conduits in flow communication with the exhaust nozzle 22 for discharging airflow into the nozzle outlet duct 48 as indicated above.

In one embodiment, the nozzle inlet duct 46 is defined by a plurality of articulated primary flaps in a conventional manner. And, the outlet duct 48 is similarly defined by a plurality of articulated secondary flaps. The flaps are joined together by suitable linkages and driven by actuators joined to the engine controller for varying the flow area of the throat 50 as well as the discharge flow area at the outlet end of the nozzle for maximizing performance of the engine from subsonic to supersonic flight speeds. In this configuration, the manifold 64 may be suitably joined in flow communication with the secondary flaps for cooling thereof and reintroducing the bypass air into the exhaust flow.

The manifold 64 illustrated in FIG. 2 preferably includes a plurality of distribution or metering valves (V) cooperating therewith and operatively joined to the controller 24. In this way, the pressurized bypass air may be discharged through the corresponding distribution valves in a uniform or nonuniform manner around the circumference of the exhaust nozzle for effecting thrust vectoring thereof. The pressurized bypass flow may be injected into the exhaust nozzle with lateral bias or skewing to in turn effect fluidic thrust vectoring and assist in controlling the flight direction of the missile.

In FIG. 2, one set of conduits extends from the distribution valves to the aft end of the outlet duct 48 for maximizing the affect of thrust vectoring when the pressurized bypass air is injected into the exhaust flow. Another set of conduits discharges another portion of the pressurized air to a suitable plenum outside the secondary flaps of the outlet duct 48 for providing convection cooling thereof.

Figure 4:
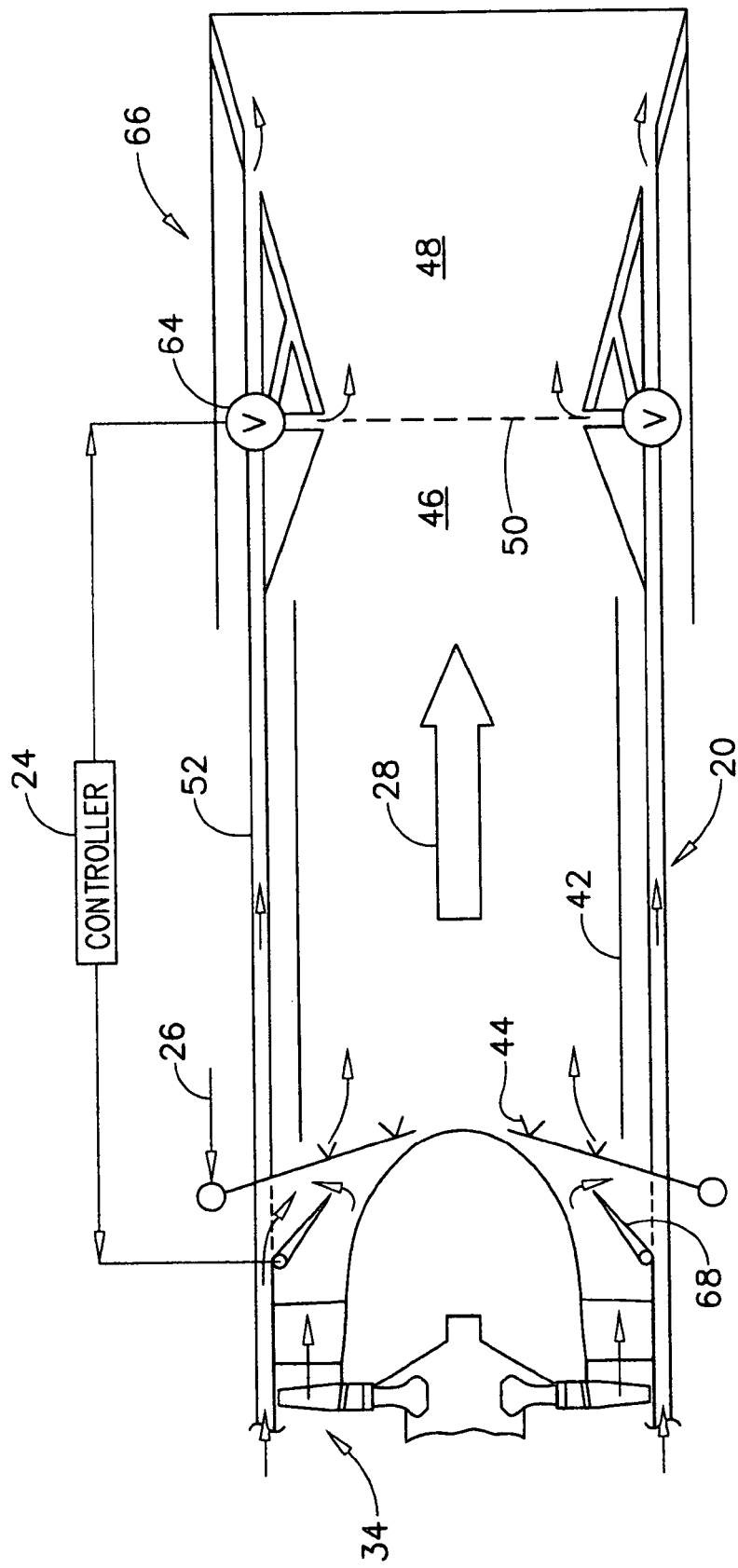
FIG. 4 is an enlarged axial sectional view of the aft end of the engine illustrated in FIG. 2 in accordance with alternate embodiments.

FIG. 4 illustrates an alternate embodiment of the exhaust nozzle, designated 66, which similarly includes a converging inlet duct 46, a throat 50 of minimum flow area, and a diverging outlet duct 48. However, instead of these inlet and outlet ducts being formed of articulated primary and secondary flaps, they may have a simpler configuration in rigid or fixed ducts that are nonvariable in flow area, with the throat minimum flow area being fixed for passing the maximum expected amount of exhaust flow through the nozzle during the flight mission.

In this embodiment, the manifold 64 may be additionally joined in flow communication through corresponding conduits directly to the throat 50 for fluidically varying flow area thereof by the injection of pressurized airflow from the bypass duct 52.

Accordingly, the afterburning turbojet engine illustrated in the FIG. 4 embodiment may be operated with a fixed physical area throat 50 and fixed physical area outlet of the exhaust nozzle. Fluidic variation of the fixed throat 50 may be conveniently effected by selectively injecting the pressurized bypass airflow into the throat 50 for reducing the available area for the combustion gases 28.

In this configuration illustrated in FIG. 4, a variable area bypass injector (VABI) 68 is disposed between the core engine 18 and the afterburner 20 in flow communication with the bypass duct 52. The VABI 68 may have any conventional configuration such as articulated flaps, or cascades, or sliding rings having actuators operatively joined to the controller 24 for selective operation thereof.

The VABIs 68 may be closed for most of the flight mission to prevent diversion of the pressurized airflow from the bypass duct 52, typically at flight speeds less than about Mach 2.8. However, for flight speeds greater than about Mach 2.8, the VABIs 68 may be selectively driven open for diverting a portion of the pressurized airflow from the bypass duct 52 into the inlet end of the afterburner 20.

The rear VABI 68 and valves in the distribution manifold 64 may be used together in conjunction with detected inlet temperature to the high pressure turbine 34 and scheduling of the VIGVs 56 of the flades to permit the physical area A8 of the throat 50 to remain constant even as afterburning temperatures are reduced beyond Mach 2.8.

Correspondingly, for low flight speed light-off or ignition of the afterburner, various combinations of the inlet turbine temperature, compressor operating line, and flade VIGV position may be used to allow fixed A8 operation. This nozzle simplification allows more flexibility in exhaust system design that can improve the efficiency and performance of the missile system. Furthermore, the cost of the exhaust system would be substantially reduced by introducing a fixed geometry therein, instead of the more complex variable geometry typically found in supersonic aircraft engines.

The fixed geometry exhaust nozzle 66 illustrated in FIG. 4 may also include, like the variable geometry exhaust nozzle 22 illustrated in FIG. 2, the additional conduits extending from the distribution manifold 64 for effecting thrust vectoring from the exhaust nozzle, as well as providing backside cooling of the diverging outlet duct 48.

As shown in FIGS. 1 and 2, the turbojet engine 12 is integrated or mounted inside the aft end of the missile 10 in a corresponding tubular engine bay 70 provided therefor. The turbojet engine 12 illustrated in FIG. 1 further includes an inlet air duct or intake 72 extending forward from the core engine in axial alignment therewith, with the intake extending forwardly through the side of the missile body or casing for receiving ambient air during subsonic to supersonic operation.

The external portion of the intake should be suitably configured for efficiently receiving ambient air 14 under ram pressure as the missile is operated from subsonic through supersonic operation. In supersonic operation, shock waves will be generated in the entrance to the intake for channeling subsonic inlet air into the core engine.

The resulting afterburning turbojet engine disclosed above is relatively small and compact and can lead to a low cost, effective propulsion solution for a volume limited, dimensionally constrained missile propulsion system. The turbojet engine results in minimum engine size while providing balanced thrust production at key transonic and supersonic flight conditions. The flade bypass system permits efficient matching of the inlet supply air from the intake to the air demanded by the compressor during operation over the supersonic flight mission. And, the relative simplicity of the afterburning turbojet engine will correspondingly reduce the production cost thereof.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. A supersonic turbojet engine comprising:
   a core engine including a multistage axial compressor having sequential stages of stator vanes and rotor blades, with the last stage of rear vanes being variable and discharging pressurized airflow to a combustor followed by a high pressure turbine, and said turbine is joined to said rotor blades by a rotor;
   an afterburner disposed coaxially with an aft end of said core engine for receiving combustion gases therefrom;
   a converging-diverging exhaust nozzle disposed coaxially with an aft end of said afterburner for discharging said combustion gases;
   a bypass duct surrounding said core engine and afterburner and terminating in flow communication with said exhaust nozzle;
   said compressor including a row of first stage fan blades extending from a supporting rotor disk, and each of said blades having an integral f lade extending from the tip thereof into said bypass duct; and
   said bypass duct includes a row of variable inlet guide vanes disposed forward of said blades for controlling airflow thereto.

2. An engine according to claim 1 wherein:
   said core engine includes an inner inlet in front of a first stage of said stator vanes;
   said bypass duct includes an outer inlet at the forward end thereof in front of said guide vanes and surrounding said inner inlet; and
   said guide vanes are operatively joined to a controller configured for controlling airflow into said bypass duct for matching airflow supply to said inner inlet to demand therefor in said core engine over an operating cycle including subsonic flight of a missile, transonic flight, and supersonic flight.

3. An engine according to claim 2 wherein said bypass duct further includes a row of outlet guide vanes disposed downstream behind said flades, and said flades are sized and configured for pressurizing airflow in said bypass duct for flow through said exhaust nozzle into said combustion gases discharged therethrough.

4. An engine according to claim 3 wherein:
   said bypass duct includes in part the casing of said afterburner;
   said exhaust nozzle includes an inlet duct converging to a throat of minimum flow area, and an outlet duct diverging aft therefrom and disposed in flow communication with said bypass duct; and
   said flades are configured to pressurize said airflow for flow through said bypass duct to cool said afterburner casing and said outlet duct.

5. An engine according to claim 4 wherein said bypass duct terminates in a flow distribution manifold disposed at said exhaust nozzle, and said manifold is joined in flow communication with said exhaust nozzle for discharging airflow into said nozzle outlet duct.

6. An engine according to claim 5 wherein said controller is operatively joined to said rear vanes, and is further configured for scheduling rotary position of said rear vanes to limit speed of said rotor during supersonic flight requiring maximum airflow through said compressor to about the speed of said rotor during subsonic flight requiring less airflow through said compressor.

7. An engine according to claim 5 wherein:
a plurality of articulated primary flaps defining said inlet duct, and a plurality of articulated secondary flaps defining said outlet duct; and
said manifold is joined in flow communication with said secondary flaps.

8. An engine according to claim 7 wherein said manifold includes a plurality of distribution valves cooperating therewith and operatively joined to said controller for varying bypass flow into said exhaust nozzle to effect thrust vectoring.

9. An engine according to claim 5 wherein:
said exhaust nozzle comprises a nonvariable inlet duct and a nonvariable outlet duct, and said throat has a fixed flow area; and
said manifold is joined in flow communication with said throat for fluidically varying flow area thereof by injecting pressurized airflow from said bypass duct therein.

10. An engine according to claim 9 further comprising a variable area bypass injector disposed between said core engine and said afterburner in flow communication with said bypass duct for selectively injecting a portion of said airflow from said bypass duct inside said afterburner to join exhaust flow from said core engine in collective flow through said fixed throat.

11. A single-rotor turbojet engine for powering a supersonic missile comprising:
a core engine including a multistage axial compressor joined by said single rotor to a high pressure turbine, with an annular combustor disposed therebetween;
an afterburner disposed coaxially with an aft end of said core engine for receiving combustion gases therefrom;
a converging-diverging exhaust nozzle disposed coaxially with an aft end of said afterburner for discharging said combustion gases;
a bypass duct surrounding said core engine and afterburner and terminating in flow communication with said exhaust nozzle;
said compressor including a row of first stage fan blades extending from a supporting rotor disk, and each of said blades having an integral flade extending from the tip thereof into said bypass duct; and
said bypass duct includes a row of variable inlet guide vanes disposed forward of said blades for controlling airflow thereto.

12. A turbojet engine comprising:
an annular intake at a forward end of said turbojet engine;
a core engine disposed in direct flow communication with said intake, and including a multistage axial compressor joined by a rotor to a high pressure turbine, with an annular combustor disposed therebetween;
an afterburner disposed coaxially with an aft end of said core engine for receiving combustion gases therefrom;
a converging-diverging exhaust nozzle disposed coaxially with an aft end of said afterburner for discharging said combustion gases;
a bypass duct surrounding said core engine and afterburner and terminating in flow communication with said exhaust nozzle;
a row of first stage fan blades extending from a supporting rotor disk in said compressor, and each of said blades having an integral flade extending from the tip thereof into said bypass duct;
said core engine further includes an inner inlet at the forward end thereof in front of said fan blades, and disposed in flow communication with said intake;
said bypass duct includes a row of variable inlet guide vanes disposed forward of said blades for controlling airflow thereto;
said bypass duct further includes an outer inlet at the forward end thereof in front of said guide vanes and surrounding said inner inlet in common flow communication with said intake; and
said guide vanes are operatively joined to a controller configured for controlling airflow into said bypass duct for matching airflow supply to said inner inlet to demand therefor in said core engine over an operating cycle including subsonic flight of a missile, transonic flight, and supersonic flight.

13. An engine according to claim 12 wherein said bypass duct further includes a row of outlet guide vanes disposed downstream behind said flades, and said flades are sized and configured for pressurizing airflow in said bypass duct for flow through said exhaust nozzle into said combustion gases discharged therethrough.

14. An engine according to claim 13 wherein:
said bypass duct includes in part the casing of said afterburner;
said exhaust nozzle includes an inlet duct converging to a throat of minimum flow area, and an outlet duct diverging aft therefrom and disposed in flow communication with said bypass duct; and
said flades are configured to pressurize said airflow for flow through said bypass duct to cool said afterburner casing and said outlet duct.

15. An engine according to claim 14 wherein:
said compressor includes a row of variable stator rear vanes in the last stage thereof; and
said controller is operatively joined to said rear vanes, and is further configured for scheduling rotary position of said rear vanes to limit speed of said rotor during supersonic flight requiring maximum airflow through said compressor to about the speed of said rotor during subsonic flight requiring less airflow through said compressor.

16. An engine according to claim 15 wherein said bypass duct terminates in a flow distribution manifold disposed at said exhaust nozzle, and said manifold is joined in flow communication with said exhaust nozzle for discharging airflow into said nozzle outlet duct.

17. An engine according to claim 16 wherein said exhaust nozzle further comprises:
a plurality of articulated primary flaps defining said inlet duct, and a plurality of articulated secondary flaps defining said outlet duct; and
said manifold is joined in flow communication with said secondary flaps.

18. An engine according to claim 17 wherein said manifold includes a plurality of distribution valves cooperating therewith and operatively joined to said controller for varying bypass flow into said exhaust nozzle to effect thrust vectoring.

19. An engine according to claim 16 wherein:

said exhaust nozzle comprises a nonvariable inlet duct and a nonvariable outlet duct, and said throat has a fixed flow area; and said manifold is joined in flow communication with said throat for fluidically varying flow area thereof by injecting pressurized airflow from said bypass duct therein.

20. An engine according to claim 19 further comprising a variable area bypass injector disposed between said core engine and said afterburner in flow communication with said bypass duct for selectively injecting a portion of said airflow from said bypass duct inside said afterburner to join exhaust flow from said core engine in collective flow through said fixed throat.

21. An engine according to claim 19 wherein said manifold includes a plurality of distribution valves cooperating therewith and operatively joined to said controller for varying bypass flow into said exhaust nozzle to effect thrust vectoring.

* * * * *